Dec. 18, 1923.
T. ORTMANN
STONE PICKER
Filed March 10, 1923  3 Sheets—Sheet 3
1,478,142
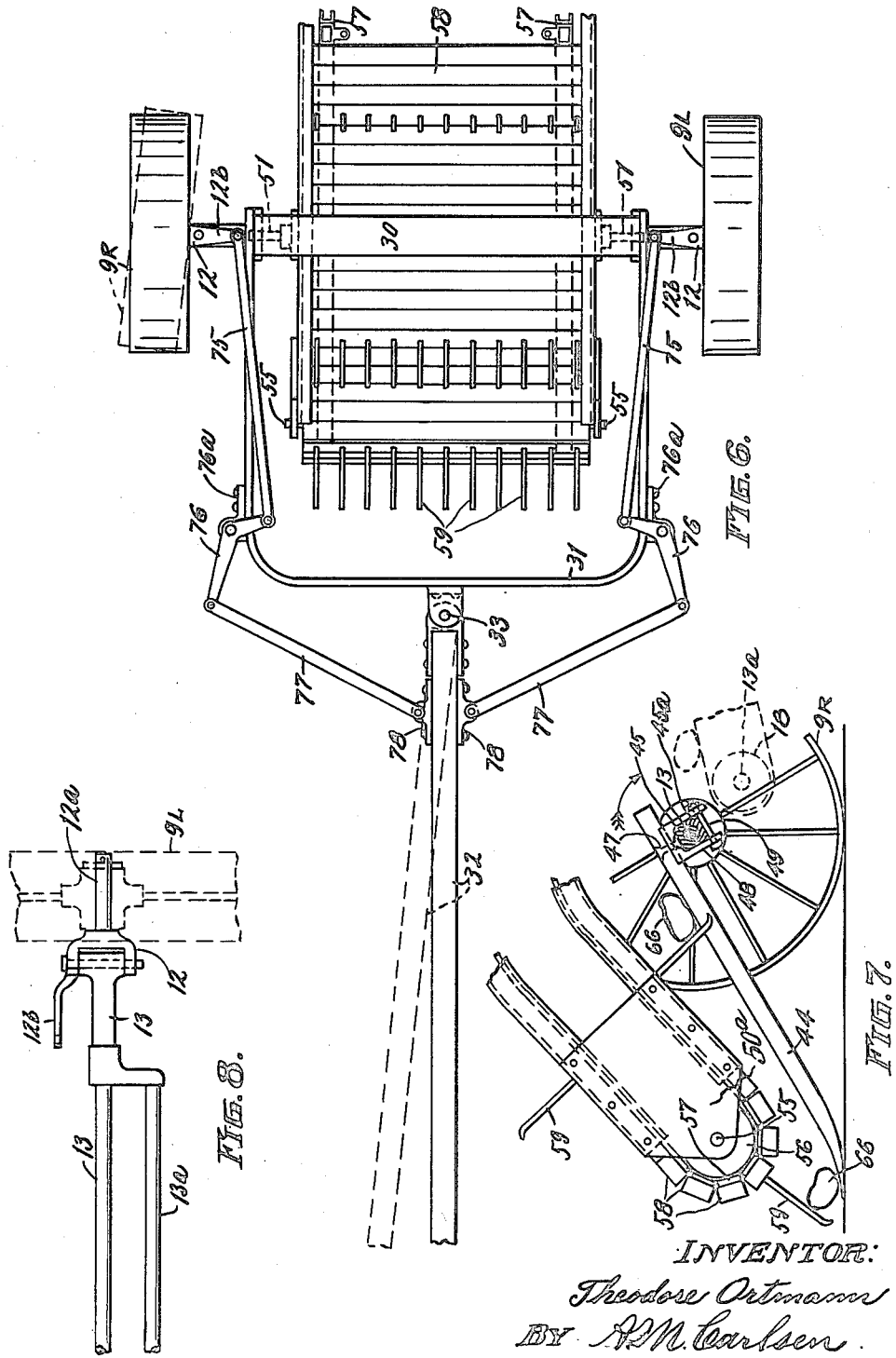
INVENTOR:
Theodore Ortmann
BY A.M. Carlsen
ATTORNEY.

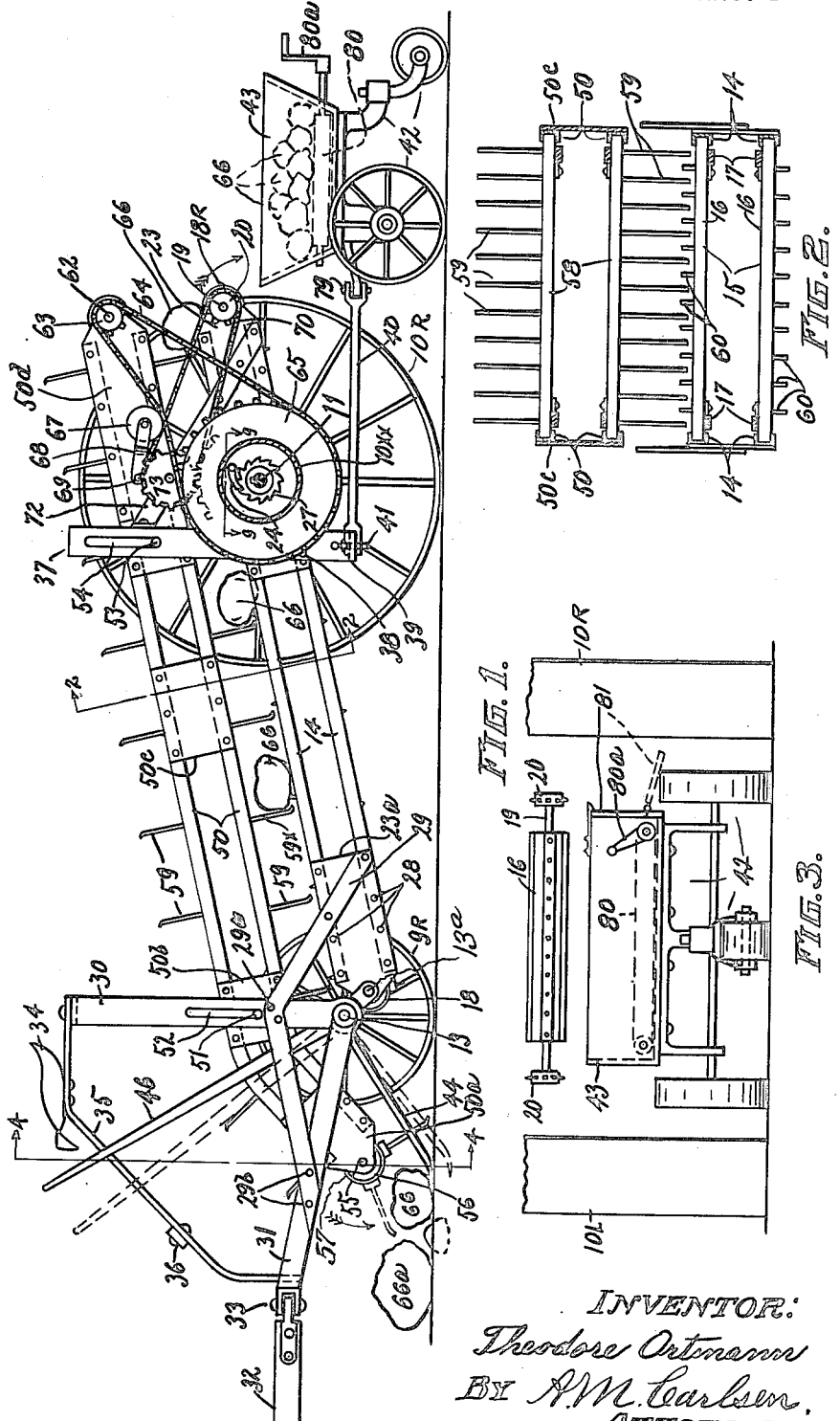

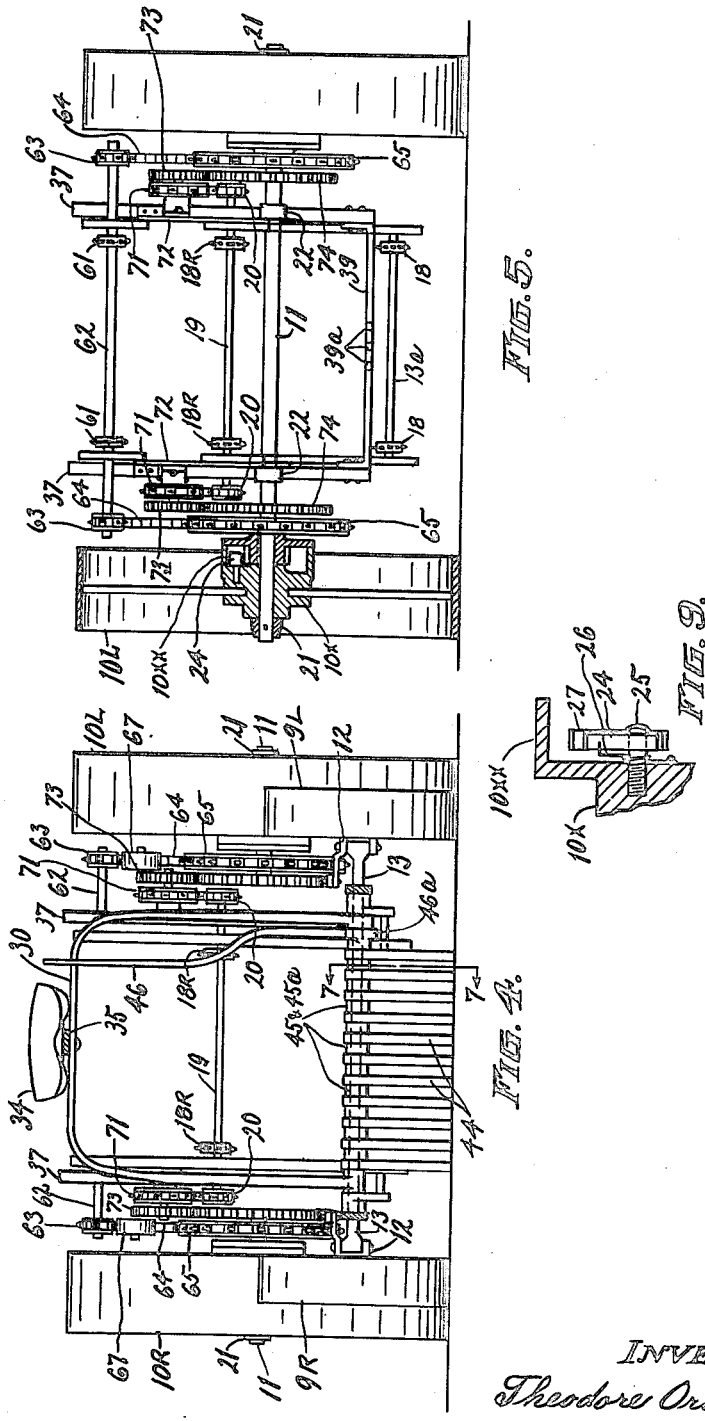

Patented Dec. 18, 1923.

1,478,142

UNITED STATES PATENT OFFICE.

THEODORE ORTMANN, OF PIERZ, MINNESOTA.

STONE PICKER.

Application filed March 10, 1923. Serial No. 624,132.

*To all whom it may concern:*

Be it known that I, THEODORE ORTMANN, a citizen of the United States, residing at Pierz, in the county of Morrison and State of Minnesota, have invented certain new and useful Improvements in Stone Pickers, of which the following is a specification.

My invention relates to stone pickers and the object is to provide a simple and efficient device adapted to pick up stones lying on top of or partially imbedded in the ground, thus increasing the value of the land by making the soil more productive as well as making such land more desirable for farming purposes.

These and other objects I attain by the novel construction illustrated in the accompanying drawings, in which,—

Fig. 1 is a left side elevation of my device with the near side ground wheels omitted to more clearly expose certain working parts, some other minor parts being also omitted.

Fig. 2 is an enlarged sectional elevation of the conveyors, as on line 2—2 in Fig 1.

Fig. 3 is a rear elevation of Fig. 1 showing mainly the stone carrying trailer and only enough of the machine to indicate their relative positions.

Fig. 4 is a front view of Fig. 1 about as on line 4—4, the draft mechanism and conveyors being omitted.

Fig. 5 is a rear view of the machine omitting details of the conveyors and showing one of the rear ground wheels in vertical section.

Fig. 6 is an enlarged top view of the front end of my device including a preferred form of draft and steering mechanism.

Fig. 7 is an enlarged sectional view on line 7—7 in Fig. 4.

Fig. 8 is an enlarged detail view of one half of the front axle.

Fig. 9 is an enlarged sectional view of the rear wheel hub about as on line 9—9 in Fig. 1.

Referring to the drawing by reference numerals my device comprises a light elongated frame mounted on the axles of two pairs of ground wheels, front wheels $9^R$ and $9^L$ for the right and left sides respectively, and two large rear ground wheels $10^R$ and $10^L$, the latter rotatably mounted on an axle 11. Said front wheels are each mounted on the short stub shaft $12^a$ of a steering knuckle 12, said knuckles being vertically pivoted to the opposite ends of the front axle 13 and having each an inwardly projecting arm $12^b$ connected to a steering mechanism to be described.

The front axle is preferably a drop forging having an integral, short, secondary axle $13^a$ arranged parallel to it (Fig. 8) the latter normally arranged below and rearward of the main axle 13 and supporting the front end of the stationary frame. Said frame extends upwardly and rearwardly to a point back of the rear axle 11 and comprises two sets of two vertically spaced channels 14, the two sets being spaced apart transversely according to the size of the machine and the flanges of said horizontally opposite channels faced toward each other and serving as tracks or guides for the opposite edges of a conveyor belt 15. Said conveyor comprises a series of transverse slats 16, each secured near its opposite ends to links 17 of two spaced link belts running over two front sprocket 18 mounted on axle $13^a$ and two rear sprockets $18^R$ mounted on a shaft 19 journaled in the rear end of the stationary frame and receiving motion through two outer chain sprokets 20 which in turn are rotated by power transmitted from the rear ground wheels as follows:

The rear wheels, which will hereinafter be called the drive or bull wheels are each held in place on the outer end of the rear axle 11 by a cap 21. Said axle revolves in bearings 22 secured to side plates 23 on the rear end of the stationary frame (see Figs. 1 and 5). The hub $10^x$ of each drive wheel has a perimetral inwardly extending flange $10^{xx}$ and a ratchet dog 24 is pivotally secured as at 25 to the inner side of the hub and adjacent the inner side of its flange and said dog is normally spring pressed away from the flange by the arm of a coil spring 26 on pin 25 (see Fig. 9) to contact with a ratchet pinion 27 keyed on the axle 11 (see Figs. 1 and 5). The dog extends forward from its pivot thus positively driving the axle in one direction only. The action of the two dogs comprises a differential for the drive axle and is readily understood by any mechanic.

The front end of the main frame has two opposite brace plates $23^a$ (see Fig. 1), suitably secured as with rivets 28 to its vertically spaced channels 14. On each of said plates I secure a brace 29 extended upwardly and secured as at $29^a$ to a vertically arranged inverted U-shape support 30 mounted on axle 13, and thence extended forward and secured as at 29<sup>b</sup> to another U-shaped horizontally disposed member 31 also mounted on the axle 13. A draft pole 32 is pivotally secured as at 33 to the front part of member 31. A driver's seat 34 may be mounted on an angular brace 35 extending from the upper part of member 30 to the front part of member 31. 36, in Fig. 1, is a suitable foot rest mounted on brace 35.

37 are two vertically arranged posts secured as at 38 to the opposite sides of the main frame and near the rear axle, and preferably made of flat bar stock (see Figs. 1 and 5). The lower ends of said posts are connected, under the main frame, by a cross bar 39 having apertures 39<sup>a</sup> in which to insert the bolt 41 of a draw bar 40 (see Fig. 1) of a trailer 42 adapted to catch, in its box 43, the stones dropped from the rear end of the conveyor in the main frame.

The initial stone handling mechanism of my device comprises a forwardly and downwardly extending fork having tines 44 which normally slide on the ground forward of the conveyor frame. Said fork is pivotally secured on the front axle (see Figs. 1, 4 and 7). An elongated bearing, bored for the axle, is split longitudinally to form two halves 45—45<sup>a</sup> (Fig. 7) and on one end thereof is secured the hub 46<sup>a</sup> of a vertically disposed lever 46 (Figs. 1 and 4) terminating near the driver's seat. Each tine 44 has its rear end secured as with a countersunk rivet 47 to a downwardly disposed clevis 48 (Fig. 7) the arms of which are drilled for a bolt 49 adapted to clamp the clevis on the elongated bearing 45—45<sup>a</sup>. Each tine is thus removable independent of the other tines, but all of them may be raised or lowered simultaneously by manipulating the lever 46, so the front end of the fork may be raised from contact with the ground or forced downwardly into the ground to get under rocks, partially imbedded, as the machine moves forward.

It will be readily understood that during the forward movement of the machine rocks on or in the ground are picked up by the fork and as the machine proceeds the rocks are moved rearwardly toward the upper run of the conveyor in the main frame on which they are dropped and conveyed rearwardly until they drop into the box 43 of the trailer. Said movement of the rocks rearwardly on the fork and further movement to the rear is preferably at a speed corresponding to the forward movement of the machine and is accomplished by proper transmission mechanism operated by the drive wheels and by an upper conveyor belt which will now be described:—

The upper conveyor is mounted in a vertically movable frame normally spaced above and about parallel with the main conveyor. It comprises a frame similar to the lower conveyor frame having two sets of oppositely disposed, upper and lower channels 50 with reinforcing side plates 50<sup>a</sup>, 50<sup>b</sup>, 50<sup>c</sup> and 50<sup>d</sup> numbered consecutively from front to rear. The opposite plates 50<sup>b</sup> have each an outwardly projecting stud 51 adapted to engage in vertical slots 52 in the opposite vertical arms of the frame member 30 (see Fig. 1) and the rear plates 50<sup>d</sup> have each a similar stud 53 engaging in a vertical slot 54 in each post 37. The front end portion of the carrier or conveyor is curved and extended downwardly toward the fork 44 and terminates just above the latter. A transverse shaft 55 is journaled in the opposite front end plates 50<sup>a</sup> and carries two keyed sprockets 56 (Figs. 1 and 7) engaged by the two link belts 57 carrying the slats 58 of the upper conveyor, the ends of the latter being guided in the channels 50. Some of these slats have a row of arms or bars 59 secured in them and said rows are spaced longitudinally of the conveyor as the design of the machine may require, and the lower conveyor is provided with spaced rows of short pegs 60 (see Fig. 2). The rear end of the upper conveyor terminates over the rear end of the lower conveyor and runs over two sprockets 61 mounted on a shaft 62 journaled in the opposite end plates 50<sup>d</sup> (Figs. 1, 4 and 5). Said shaft and sprockets are rotated by sprockets 63 keyed on the shaft 62 outside of the frame and each of said sprockets 63 is rotated by a chain 64 engaging a large sprocket wheel 65 keyed on the drive wheel shaft adjacent the drive wheel. The upper conveyor is thus driven in a direction such that its upper run is moving forward when the machine is in motion, the bars 59 swinging forward when reaching the front end of the conveyor and grasping or pushing rocks 66 on to the fork. The continued movement of the conveyor causes the said bars, now on the lower run of the conveyor, to carry the rocks up on the fork until they drop on the lower conveyor. The said bars 59 are spaced so as to move between the tines 44 of the fork.

The rows of stub pins 60 on the upper run of the lower conveyor engage the under side of the rocks and the parallel movement of the bars 59 of the upper conveyor causes said bars to engage particularly the larger rocks and move them also toward the rear (see bar 59<sup>x</sup> in Fig. 1). Should an extra large rock, as 66<sup>a</sup> in Fig. 1, be encountered, the arms 59 will engage it in the same manner but if the space between the front end of the upper conveyor and the fork be too small for such rock to get through, the downward pressure of the bars 59 engaging the rock will be resisted by the rock and the upper conveyor will be raised by such resistance and such raising is provided for by the slot 52 in each frame member 30 the pins 51 of the conveyor being slid upwardly therein. As such rock is elevated and passed rearwardly the rear end of the upper conveyor automatically rises in the slots 54 of the rear posts 37 and after the rock is dropped in the trailer the conveyor drops back to its original position.

The chain 64 driving the upper conveyor is long enough to permit the above described spreading of the conveyors, a chain tightener being provided such as a heavy roller 67 (Fig. 1) mounted in one end of an arm 68 the other end of which is pivotally secured as at 69 on the conveyor frame.

The lower conveyor belt is driven at the same speed as the upper conveyor, the adjacent runs of the two being moved rearwardly. Said lower conveyor is driven by the previously mentioned sprockets 20 keyed on the ends of its rear shaft 19 and each rotated by a link belt 70 engaging a sprocket 71 rotatably mounted on a bracket 72 on the rear of the main frame. A pinion 73 secured to each of said sprockets 71 meshes with a gear 74 keyed on the drive wheel axle.

From the above description it will be readily understood that this machine will clear a field of rocks with the minimum effort. As the conveyors travel rearwardly at the same speed as the machine travels forward it will be seen that the rocks are in reality only picked up and elevated high enough to drop them in the box of the trailer. There is practically no movement of the rocks in the direction the machine travels thus eliminating any waste of power.

In Fig. 6 I have illustrated a preferred form of steering apparatus connecting both front wheels with the draft pole in a manner to turn the front wheels to the angle of the draft pole. A link 75 is pivotally connected to the steering knuckle arm 12b of each front wheel and extends forward and is pivotally connected at its front end to one arm of a bellcrank 76 secured in a bracket 76a on the frame member 31. The other arm of the bellcrank is connected to a link 77 extended and pivotally secured with its other end to a bracket 78 on the side of the draft pole 32 and near the rear end of the latter. Thus for example, if the horses or other tractive power swing the draft pole to the right, the right hand link 77 is pushed to the right and the bellcrank 76 is operated so that its rear arm pulls on link 75 thereby pulling the knuckle arm 12b and the ground wheel is turned to a position parallel with the draft pole.

The trailer illustrated in Figs. 1 and 3 may have a draw bar pin 79 to readily detach the trailer from the main machine. In the bottom of the box is a transversely arranged belt conveyor 80 operable by a hand crank 80a. One end of the box is provided with a drop side or hinged wall 81 which may be dropped down and the hand crank may then be used to move the belt 80 to unload the stones that have been accumulated in the box.

Of course I provide means for raising the stone picking device clear of the ground when it is idle, and antifriction rollers guiding the endless conveyors in their frames, but as such means are not new in similar machinery I do not show or describe or claim them.

What I claim is:—

1. In a stone picking device of the kind described an elongated rectangular frame mounted on a pair of steering wheels and a pair of bull wheels, a ground engaging fork pivotally mounted on the axle of the steering wheels and sloping forward therefrom, two vertically spaced endless conveyors mounted in said frame, the lower conveyor inclined upwardly in the frame from a point below and rearward of the fork to a point rearward of the bull wheel axle, the upper conveyor extending upwardly from a point above the front end of the fork thence rearwardly in substantially parallel relation to the lower conveyor and terminating vertically above the rear end of the lower conveyor, means operatively connected with the bull wheels for moving the adjacent runs of the conveyors rearwardly with the same velocity, means on the upper conveyor for engaging rocks to move them upwardly on the fork and thence co-operating with means on the lower conveyor to convey the rocks to the rear of the machine and means for storing said rocks rearward of the conveyors.

2. The structure specified in claim 1, in which said lower conveyor is fixedly mounted in the frame and the upper conveyor is mounted in vertically adjustable relation to the lower conveyor.

3. The structure specified in claim 1, said fork comprising a row of tines the forward ends of which normally glide on the ground, the rear end of each tine detachably secured to a sleeve rotatably mounted on the steering wheel axle and means attached to said sleeve to adjust the fork to various angles.

4. The structure specified in claim 1, said co-operating rock conveying means comprising a number of spaced rows of transversely arranged pegs in the lower conveyor and a number of corresponding rows of tines in the upper conveyor adapted to engage rocks on the ground forward of the fork and push them rearwardly on to the fork thence upwardly therein to the upper run of the lower conveyor, said pegs and tines in the adjacent runs of the conveyors simultaneously contacting with the rocks and moving them rearwardly to the ends of the conveyors.

5. The structure specified in claim 1, said means for storing the rearwardly conveyed rocks comprising a trailer having a box for catching the rocks dropped from the rear end of the conveyors, means for unloading the rocks from said box and means for readily detaching the trailer from the stone picking machine.

6. The structure specified in claim 1, said driving means for the conveyor comprising, for the upper conveyor and on each side of it, a sprocket wheel keyed on the bull wheel axle, a link belt driven by said sprocket and driving another sprocket on a shaft adapted to drive the conveyor and journaled in the rear end of its frame; further means for driving the lower conveyor comprising a gear keyed on the bull wheel axle adjacent each of the above sprocket wheels, a pinion meshing with said gear, a sprocket secured to said pinion and engaged by a link belt adapted to drive a sprocket keyed on a shaft journaled in the rear end of the main frame and adapted to drive the lower conveyor.

7. The structure specified in claim 6, and a differential incorporated between the bull wheel axle and the conveyor driving means.

8. The structure specified in claim 1, and a yoke extended forward of the fork from the steering wheel axle, a draw bar pivotally connected to said yoke, means operatively connected with said draw bar and with the steering wheels to turn the latter, simultaneously, in the direction of the draw bar pull.

In testimony whereof I affix my signature.

THEODORE ORTMANN.